United States Patent [19]

Nawaki

[11] Patent Number: 4,686,709

[45] Date of Patent: Aug. 11, 1987

[54] OPTICAL TRANSMISSION CIRCUIT

[75] Inventor: Masaru Nawaki, Nara, Japan

[73] Assignee: Sharp Kabushiki Kaisha, Osaka, Japan

[21] Appl. No.: 751,621

[22] Filed: Jul. 2, 1985

[30] Foreign Application Priority Data

Jul. 18, 1984 [JP] Japan .................................. 59-150943

[51] Int. Cl.$^4$ .................................................. H04B 9/00
[52] U.S. Cl. ...................................... 455/613; 372/38; 455/618
[58] Field of Search ............... 455/603, 606, 607, 608, 455/613, 617, 618, 611; 372/26, 28, 38; 370/11; 332/7.51

[56] References Cited

FOREIGN PATENT DOCUMENTS 3305033   8/1984   Fed. Rep. of Germany ...... 455/613

OTHER PUBLICATIONS

Nakamura–Optical Transmission System–JEE–Mar. 1978–No. 135, pp. 18-21.

*Primary Examiner*—Joseph A. Orsino, Jr.
*Attorney, Agent, or Firm*—Flehr, Hohbach, Test, Albritton & Herbert

[57] ABSTRACT

An optical transmission circuit comprises a self-excited oscillator means using a negative-resistance semiconductor light-emitting element with a first load resistor, a modulator means for modulating the frequency of said self-excited oscillator means by an input of an analog quantity, and a means for intermittently connecting a second load resistor in place of said first load resistor by an input of a digital quantity, said second load resistor intersecting the light-emitting region of said negative-resistance semiconductor light-emitting element.

8 Claims, 6 Drawing Figures

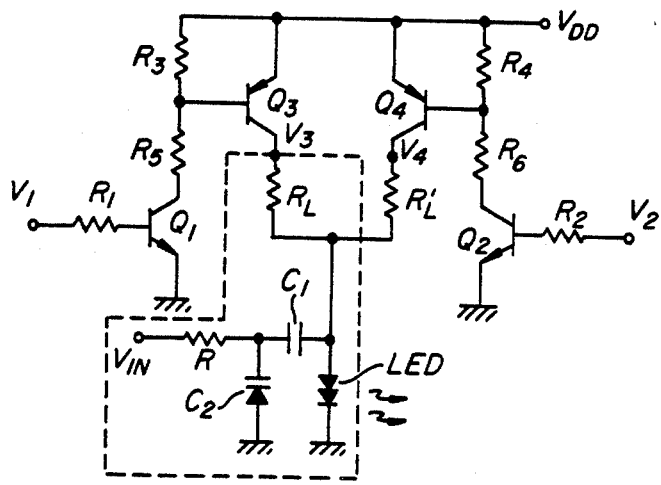
FIG._1.
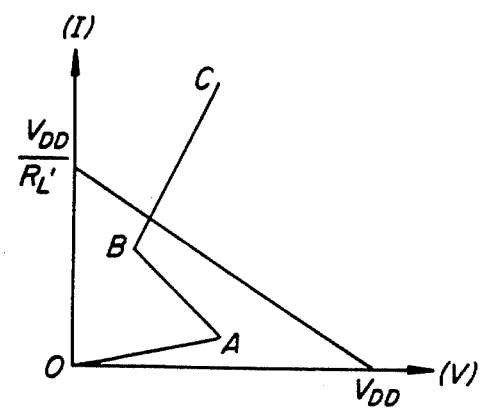
FIG._2.
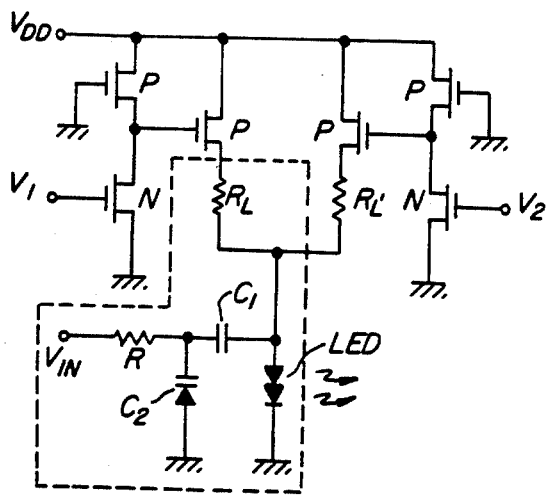
FIG._3.
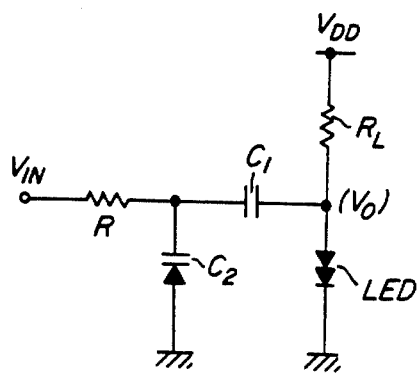
FIG._4.
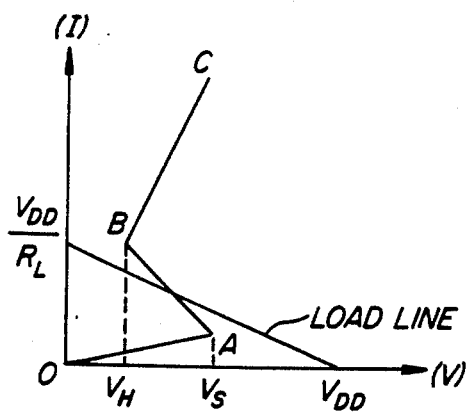
FIG._5.
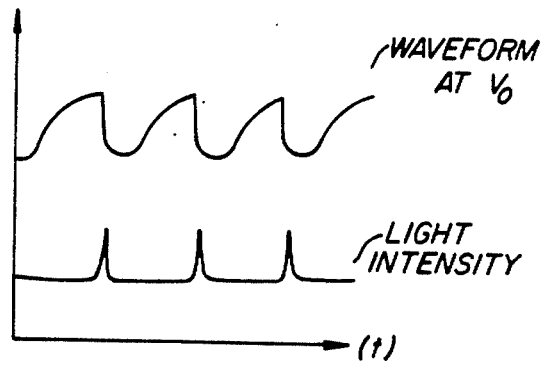
FIG._6.

OPTICAL TRANSMISSION CIRCUIT

This invention relates to an optical transmission circuit using a negative-resistance semiconductor light-emitting element.

For the transmission of digital data, conventional optical transmission circuits convert the digital data first into analog data (such as by FSK modulation). This causes the modulation speed to drop below the oscillation frequency and lowers the speed of transmission.

It is therefore an object of this invention in view of the aforementioned problem to provide a single circuit which can transmit analog quantities by analog transmission and digital quantities by digital transmission.

Another object of the present invention is to provide an optical transmission circuit capable of both pulse FM analog transmission of analog quantities and digital transmission of digital quantities simply by switching between load resistors connected to a negative-resistance semiconductor light-emitting element.

The above and other objects of the present invention are attained by providing an optical transmission circuit comprising a self-excited oscillator means which uses a negative-resistance semiconductor light-emitting element, a modulator means for modulating the frequency of the self-excited oscillator means by inputting an analog quantity, and a means for intermittently connecting in place of a first load resistor of the self-excited oscillator means a second load resistor which intersects the light-emitting region of the negative-resistance semiconductor light-emitting element by the input of a digital quantity.

FIG. 1 is a circuit diagram showing one embodiment of the present invention.

FIG. 2 is a characteristic curve.

FIG. 3 is a circuit diagram showing another embodiment of the present invention.

FIG. 4 is a circuit diagram of a pulse FM optical analog transmission circuit used in an embodiment of this invention.

FIG. 5 is a characteristic curve of a negative-resistance semiconductor light-emitting element used in FIG. 4.

FIG. 6 is a time chart for explaining the operation of the analog transmission circuit of FIG. 4.

FIG. 1 is a circuit diagram of an optical transmission circuit according to one embodiment of the present invention wherein the portion surrounded by a dotted line represents a pulse FM optical analog transmission circuit shown in FIG. 4. FIG. 5 is a characteristic curve of the negative-resistance semiconductor light-emitting element used in FIG. 4.

FIG. 4 includes a load resistor $R_L$ with resistance greater than the value of the negative resistance of the negative-resistance semiconductor light-emitting element LED. It is so designed that its load line intersects the negative resistance region A-B of the negative-resistance semiconductor light-emitting element LED as shown in FIG. 5. If a capacitor is connected in parallel with the negative-resistance semiconductor light-emitting element LED under this condition, this circuit self-excitedly oscillates and emits optical pulses. In FIG. 4, use is made of a combination of two capacitors $C_1$ and $C_2$, $C_2$ being a variable capacitor element. Frequency modulations can thus be effected by varying the voltage inputted at the junction point $V_{IN}$ (through a resistor R) as well as the capacitance of the variable capacitor element $C_2$. FIG. 6 shows the relationship between the voltage waveform at the point $V_0$ in FIG. 4 and the light intensity emitted from the negative-resistance semiconductor light-emitting element LED. This is how the optical transmission circuit of FIG. 4 can transmit an analog quantity inputted at $V_{IN}$ by modulating it in optical pulse row intervals (that is, by pulse FM).

Next, the operation of the optical transmission circuit according to the present invention will be explained by way of FIG. 1. When $V_1$ and $V_2$ are both "L" (low), transistors $Q_1$, $Q_2$, $Q_3$ and $Q_4$ are OFF and this circuit will not function. When $V_1$ is switched to "H" (high, or about 3–5 V), transistors $Q_1$ and $Q_3$ become ON and the point $V_3$ is raised to a level close to $V_{DD}$. Since the load resistor $R_L$ is set so as to satisfy the condition shown by FIG. 5, the circuit inside the dotted line oscillates self-excitedly and the pulse FM optical analog transmission of FIG. 4 becomes possible.

On the other hand, if $V_1$ is switched to "L" to bring the transistors $Q_1$ and $Q_3$ into an OFF condition and then $V_2$ is switched to "H", the transistors $Q_2$ and $Q_4$ become ON and the voltage at $V_4$ reaches a level nearly equal to $V_{DD}$. The load value of the resistance of the load resistor $R_L'$ intersects the light-emitting region B-C of the negative-resistance LED as shown in FIG. 2 and if the voltage at $V_4$ is nearly equal to $V_{DD}$, the negative-resistance semiconductor light-emitting element LED does not oscillate but continues to emit light stably. If $V_2$ is switched to "L" by leaving $V_1$ in the "L" condition, the transistors $Q_2$ and $Q_4$ switch to OFF and the negative-resistance semiconductor light-emitting element LED stops emitting light. In other words, light is emitted when $V_2$ is "H" and emission stops when $V_2$ is switched to "L". Accordingly, an optical output corresponding to an input of digital data at $V_2$ can be obtained, or optical digital transmission becomes possible.

The bipolar transistors used in the circuit of FIG. 1 may be replaced by MOSFETs in such a situation, the circuit may look as shown in FIG. 3. Explanation for this circuit will be omitted.

In summary, the present invention makes it possible to transmit analog quantities by pulse FM analog transmission and digital quantities by digital transmission simply by switching between two load resistors connected to a negative-resistance semiconductor light-emitting element. Thus, the present invention avoids the problem of lowering transmission speed when digital quantities are transmitted by an analog system and obviates the need for A/D and D/A converters which used to be indispensable for transmitting analog quantities by a digital system, thus simplifying the circuit structure. The negative-resistance semiconductor light-emitting element mentioned above may be a GaAs negative-resistance LED. In the figures, R, $R_1$, $R_2$, $R_3$, $R_4$, $R_5$ and $R_6$ are resistors and $V_{DD}$ represents a source voltage.

The detailed description and specific examples given above, while indicating preferred embodiments of the invention, are nevertheless intended to be only illustrative. Various changes and modifications are within the spirit and scope of the invention as will become apparent to those skilled in the art. All such changes and modifications are intended to be included within the scope of the following claims.

What is claimed is:

1. An optical transmission circuit comprising a self-excited oscillator means including a negative-resistance semiconductor light-emitting element and a first load resister which are connected in series, a modulator means connected to a point between said negative-resistance semiconductor light-emitting element and said first load resister for modulating the frequency of said self-excited oscillator means by an analog input to said modulator means, a second load resistor connected in parallel to said first load resistor and in series with said negative-resistance semiconductor light-emitting element, said second load resistor having a load line which intersects the light-emitting region of said negative-resistance semiconductor light-emitting element, and a means for intermittently switching the effective connection of said negative-resistance semiconductor light-emitting element from said first load resistor to said second load resistor by a digital input to said intermittently switching means.

2. The optical transmission circuit of claim 1 wherein the resistance of said first load resistor is greater than the absolute value of the negative resistance of said negative-resistance semiconductor light-emitting element.

3. The optical transmission circuit of claim 1 wherein said modulator means includes a capacitor with one electrode connected to said point between said negative-resistance semiconductor light-emitting element and said first load resistor.

4. The optical transmission circuit of claim 1 wherein said modulator means includes two capacitors each with an electrode connected to a junction point, said analog input being made at said junction point.

5. The optical transmission circuit of claim 1 wherein said intermittently switching means includes a pair of transistors which are respectively connected in series with said first and second load resistors and serve to invalidate effective connection of one of said load resistors with said negative-resistance semiconductor light-emitting element.

6. The optical transmission circuit of claim 5 wherein said transistors are switched on and off by said digital input.

7. The optical transmission circuit of claim 5 wherein said transistors are bipolar transistors.

8. The optical transmission circuit of claim 5 wherein said transistors are MOSFETs.

* * * * *